Jan. 12, 1937. H. C. BERRY Re. 20,234

FALSE TEETH

Original Filed Jan. 6, 1930

H. C. Berry Inventor

By C. A. Snow & Co. Attorneys.

Reissued Jan. 12, 1937

Re. 20,234

UNITED STATES PATENT OFFICE 20,234

FALSE TEETH

Harry Chester Berry, Little Rock, Ark.

Original No. 1,941,735, dated January 2, 1934, Serial No. 418,933, January 6, 1930. Application for reissue December 30, 1935, Serial No. 56,842

7 Claims. (Cl. 32—8)

This invention relates to dentistry, the primary object of the invention being to provide artificial teeth that will insure the maximum efficiency in mastication with the minimum effort, and to eliminate gum irritation by the constant rubbing of the plates.

An important object of the invention is to provide false teeth that will not lock when pressed together, thereby preventing irritation of the gums caused by the plates carrying the teeth over the gums.

Another important object of the invention is the provision of false teeth wherein the cusps of the upper and lower cooperating teeth are so constructed that they will cut the food rather than grind it.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
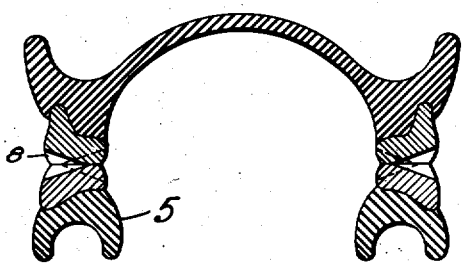
Figure 1 is a sectional view through plates and cooperating teeth supported by the plates.
Figure 2:
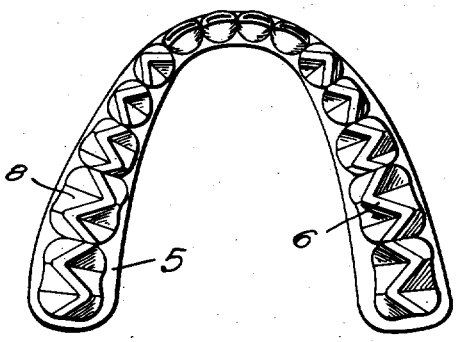
Figure 2 is a plan view of the occlusal surfaces of the teeth.
Figure 3:
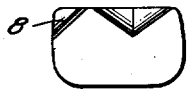
Figure 3 is an elevational view of one of the teeth.
Figure 4:
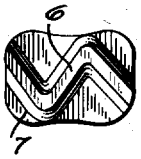
Figure 4 is a plan view of one of the teeth.

Referring to the drawing in detail, the reference character 5 designates a plate in which the teeth constructed in accordance with the present invention are positioned.

The occlusal surfaces of the teeth are so constructed that the cusps 6 are disposed longitudinally of the teeth and arranged in zig zag formation, the ends of the cusps of one tooth meeting with the ends of the cusps of the adjacent teeth so that a continuous zig zag cutting edge is formed throughout the length of the plate.

The cusps of the upper and lower teeth are so arranged with respect to each other that they meet throughout the lengths of the cusps, to cut the food as the cusps move together.

As shown, the cusps of the teeth have flattened biting surfaces 7, and the surfaces of the teeth at the bases of the cusps slope downwardly and laterally as at 8 so that food will be forced laterally and will not clog the spaces between the cusps, to cause a locking of the upper and lower teeth.

Figure 7:
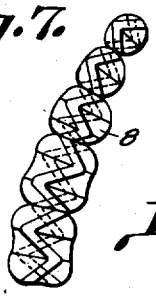
Figure 7 is a view illustrating the cooperation between the occlusal surfaces of the teeth of upper and lower plates.
Figure 5:
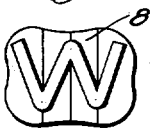
Figure 5 is a plan view of a tooth illustrating a modified form of occlusal surface.
Figure 6:
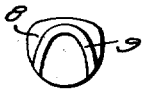
Figure 6 is a view of a tooth showing a further modified form of occlusal surface.
Figure 8:
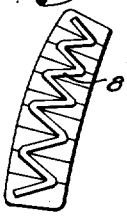
Figure 8 is a plan view of the occlusal surface of a block used in plate or bridge work.

In the form of the invention as shown by Figure 6 of the drawing, the cusp 9 which is designed primarily for smaller teeth, is substantially U shaped, and it is to be understood that the cusp of the cooperating tooth will be arranged to cross the cusp of the first mentioned tooth in a manner as clearly illustrated by Figure 7 of the drawing.

As shown by Figure 6, the cusp of the tooth is curved, this form of cusp being particularly designed for smaller teeth.

From the foregoing it will be obvious that due to this construction, the grooves between the ridges will not become clogged, and the cusps will cause a cutting action of the teeth in place of the usual grinding necessary in false teeth.

I claim:

1. In combination, coacting upper and lower dentures, embodying teeth having occlusal surfaces formed with a cutting edge, the cutting edges of the coacting upper and lower dentures extending throughout the lengths of the teeth and disposed in a zig zag line, the zig zag lines of the cutting edges of the upper and lower dentures being offset with respect to each other, whereby when said surfaces are brought together, the dentures may be actuated laterally and longitudinally in the occlusal plane, without cuspal interference.

2. In combination, coacting upper and lower dentures, embodying teeth having their occlusal surface formed with a cutting edge, the cutting edges of the coacting upper and lower dentures crossing each other at oblique angles with respect to each other, said occlusal surfaces lying in a single plane at right angles to the vertical axis of the teeth, when said surfaces are brought together.

3. A set of false teeth comprising upper and lower dentures having a series of cuspless ridges and grooves extending throughout the length and breadth of the top surfaces of the teeth, the said ridges and grooves forming spillways open to sides of the teeth, and the ridges so disposed that the cutting edges of the upper and lower teeth are offset with respect to each other mesio-distally and linguo-buccally, whereby interlocking is prevented and food packing is minimized.

4. In combination, an artificial tooth having its occlusal third provided with a zig-zag cutting ridge forming an occlusal plane, the top surface of the tooth intermediate the ridge being an open spillway extending to the side of the tooth for the excursion of food, and a similar opposing tooth having its ridge crossing the ridge of the first-mentioned tooth at an angle to prevent interlocking.

5. In combination, an artificial tooth having its occlusal third provided with a cutting ridge extending in a curved line, the top surface of the tooth intermediate the ridge being an open spillway extending to the side of the tooth for the excursion of food, and a similar opposing tooth having its ridge crossing the ridge of the first-mentioned tooth at an angle to prevent interlocking.

6. In combination, an artificial tooth having its occlusal third provided with a cutting ridge extending in an angular line, the top surface of the tooth intermediate the ridge being an open spillway extending to the side of the tooth for the excursion of food, and a similar opposing tooth having its ridge crossing the ridge of the first-mentioned tooth at an angle to prevent interlocking.

7. In combination, co-acting upper and lower dentures embodying teeth having their occlusal surfaces formed with cutting ridges extending in an irregular manner over the top surface of the tooth, the surface between the ridges being formed thereby into open-faced and open-ended grooves extending from the ridges to the lingual and buccal surfaces of the teeth to form spillways, and the ridges of opposed teeth crossing each other at angles to prevent interlocking.

HARRY CHESTER BERRY.